US006972854B1

(12) United States Patent  (10) Patent No.: US 6,972,854 B1
Jung  (45) Date of Patent: Dec. 6, 2005

(54) METHOD FOR PROCESSING DUAL JOB AT MULTI FUNCTION PERIPHERAL

(75) Inventor: Young-Do Jung, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/567,328

(22) Filed: May 9, 2000

(51) Int. Cl.$^7$ ............................................. G06F 15/00
(52) U.S. Cl. ...................... 358/1.1; 358/1.14; 358/442; 358/443; 358/468
(58) Field of Search ........................ 358/1.1, 437, 404, 358/436, 442, 1.14, 468, 135, 443; 399/411

(56) References Cited

U.S. PATENT DOCUMENTS

| 4,907,094 A |   | 3/1990  | Mishima et al. ............. 358/437 |
| 5,311,327 A |   | 5/1994  | Fukushima et al. .......... 358/444 |
| 5,506,657 A |   | 4/1996  | Ito et al. ...................... 399/411 |
| 5,669,056 A | * | 9/1997  | Rubscha ....................... 399/367 |
| 5,689,730 A |   | 11/1997 | Wakasugi ..................... 710/56 |
| 5,801,839 A |   | 9/1998  | Ochiai ........................ 358/404 |

* cited by examiner

Primary Examiner—Twyler Lamb
(74) Attorney, Agent, or Firm—Robert E. Bushnell, Esq.

(57) ABSTRACT

A dual job processing method of a multifunction peripheral having a carrier driver, a line feed driver and a scan driver, prevents power overload by avoiding overlapping actuation of the three drivers when dual job operations are requested. When an operation, that requires the use of the scan driver being requested while printing, is being performed by driving the carrier driver, the document scanning is performed by driving the scan driver, and the drive time for the line feed driver is delayed and initiated after the driving of the carrier driver is completed. When a request for printing is requested while scanning is being performed by driving the scan driver, printing is performed by driving the carrier driver, and the drive time for the line feed driver is delayed and initiated after driving of the carrier driver is completed. Accordingly, by avoiding the region where the actions of three drivers overlap, power overload can be prevented, the power supply device can be used with maximum efficiency and a problem such as power drop, which is derived from power overload, can be resolved.

20 Claims, 4 Drawing Sheets

METHOD FOR PROCESSING DUAL JOB AT MULTI FUNCTION PERIPHERAL

BACKGROUND OF THE INVENTION

1. Field of Invention

This invention relates to a method for processing dual jobs at a multifunction peripheral, and more particularly, to a dual job processing method for a multifunction peripheral provided with a carrier driver, line feed driver and scan driver, for preventing overload operation by preventing overlapping actions of the three drivers in case of dual job occurrence.

2. Related Art

At the present time, office appliances such as printers, scanners and facsimiles are widely used. Each office appliance is being developed for higher performance to expand its respective characteristic functions, and therefore more expensive products are being produced. Meanwhile, respective office appliances, which were used independently, are being developed into a single integrated unit, and products, which reduce expenses on the part of the consumers, are being produced. These products are referred to as all-in-one multifunction peripherals.

Generally, a multifunction device is provided with a document scanning device, a printing device and a communication device, and these devices are used to perform operations such as scanning, facsimile transmission and reception of scanned document data, and printing for the host computer or for received facsimile data.

As depicted in FIG. 1, an inkjet multifunction peripheral includes a carrier driver 100 having a carrier motor 120 for moving the carrier which is mounted with an ink head 110, a driver thereof and related devices; a line feed driver 200 includes a line feed motor for picking up and transporting paper that is prepared on an automatic or manual paper supplying device, a driver thereof and related devices; a scan driver 300 includes a driver that scans documents by transporting documents to a scanning module 310 through the use of a scan motor and driving the scanning module 310, and related devices; a multifunction peripheral controller 400 that controls the actions of the respective three drivers, communicates with the host computer, and performs facsimile data communication with other multifunction peripherals.

Inkjet multifunction peripherals of this type may have three or more drivers, and as depicted in FIG. 2, the action profile for actuating each driver is classified into an acceleration region which prepares the driver until normal action can be preformed when a drive request is made to the driver in a standstill condition due to the mechanical characteristics of the driver, a uniform speed region in which the driver performs normal action, a deceleration region which progressively decreases action speed when a drive completion request is made during normal action performance due to the mechanical characteristics of the driver, and a standstill region in which the driver comes to a standstill after a certain amount of time.

Generally, inkjet multifunction peripherals can transmit facsimiles while printing the print data received from the host computer, and vice versa, i.e., receive and print data while transmitting facsimiles. These functions are referred to as dual jobs.

FIG. 3 shows the drive profile of each driver performing a dual job of transmitting a facsimile and printing print data in a multifunction peripheral. Region 1 is where the carrier driver and the scan driver are driven at the same time, region 2 is where the line feed driver and the scan driver are driven at the same time, and region "a" is where the carrier driver, line feed driver, and scan driver are driven at the same time.

When three drivers are driven at the same time, as in region "a", the power supply device is overloaded and a drop in power is experienced. Due to this phenomenon, an error in the mechanical actions of the multifunction peripheral may occur. Since the power capacity must be increased to supply more than the requisite power quantity so that this kind of overload can be avoided, the problem of increased manufacturing cost arises.

SUMMARY OF THE INVENTION

Therefore, this invention is disclosed to resolve the derived problems occurring from power overload due to simultaneous driving of three drivers, and accordingly, the object of this invention is to avoid the region where the actions of three drivers overlap and thus to prevent power overload.

Another object of this invention is to provide a power supply device having maximum efficiency to resolve problems that are derived from power overload such as power drop, etc.

Accordingly, to accomplish the above objects, in a multifunction peripheral having a carrier driver, a line feed driver, and a scan driver, there is provided a method for dual processing of a multifunction peripheral, where an operation which requires the use of the scan driver is requested while a printing operation is being performed by driving the carrier driver, documents are scanned by driving the scan driver, and the drive time for the line feed driver is delayed and initiated after the driving of the carrier driver is completed.

Preferably, the dual processing method for a multifunction peripheral according to the present invention, performs printing operation by driving the carrier driver when a printing operation is requested while a scanning action is being performed by driving the scan driver, and delays the drive time for the line feed driver so that it is initiated after the driving of the carrier driver is completed.

Preferably, the dual processing method for a multifunction peripheral, according to the present invention, starts driving the carrier driver after the driving of the line feed driver is completed.

Preferably, the operation that requires the use of the scan driver is a facsimile transmission operation.

DETAILED DESCRIPTION OF THE PREFERRED EMBODIMENTS

The objects, features and advantages of this invention are described in greater detail hereinafter through the preferred embodiments with reference to the annexed drawings.

The terminology used hereinafter are defined terms accounting for the functions of this invention and may vary according to the intentions and conventions of those skilled in the art, and therefore the definitions thereof should be given on the basis of the overall contents of this specification.

Figure 1:
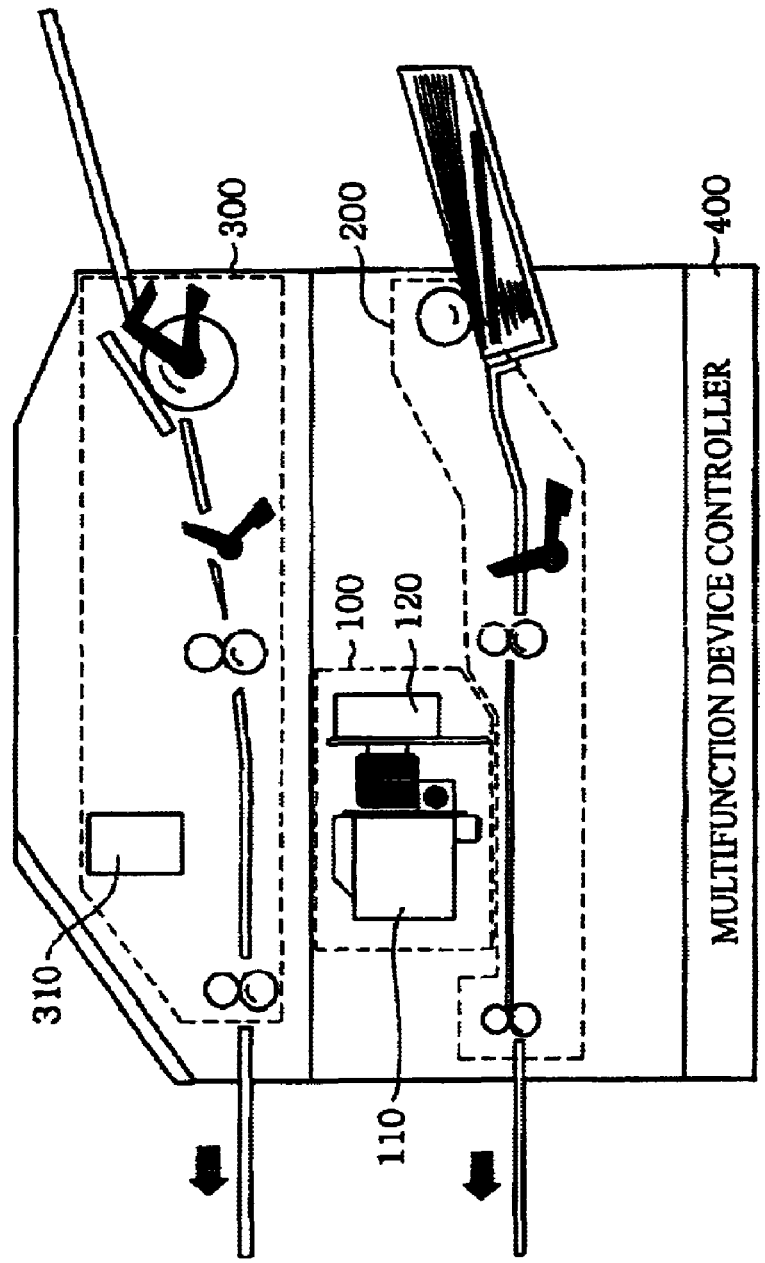
FIG. 1 shows a multifunction peripheral supporting dual job operations.
Figure 2:
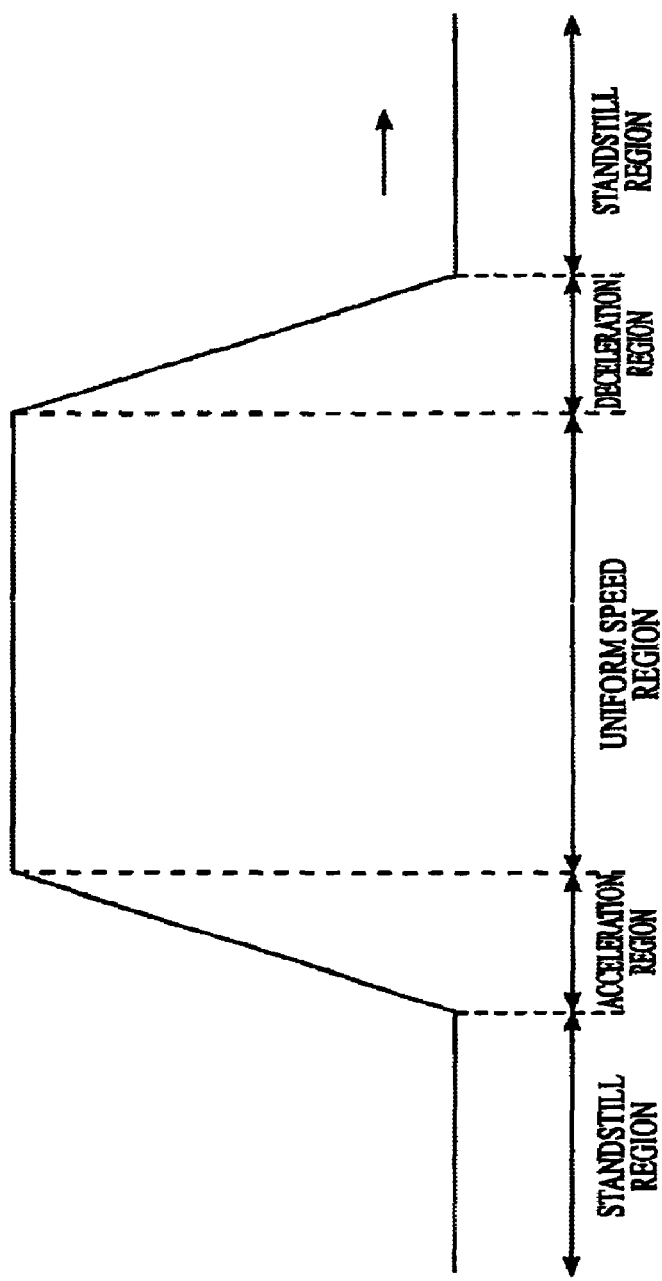
FIG. 2 shows the actuation regions commonly applied to each drive profile.
Figure 3:
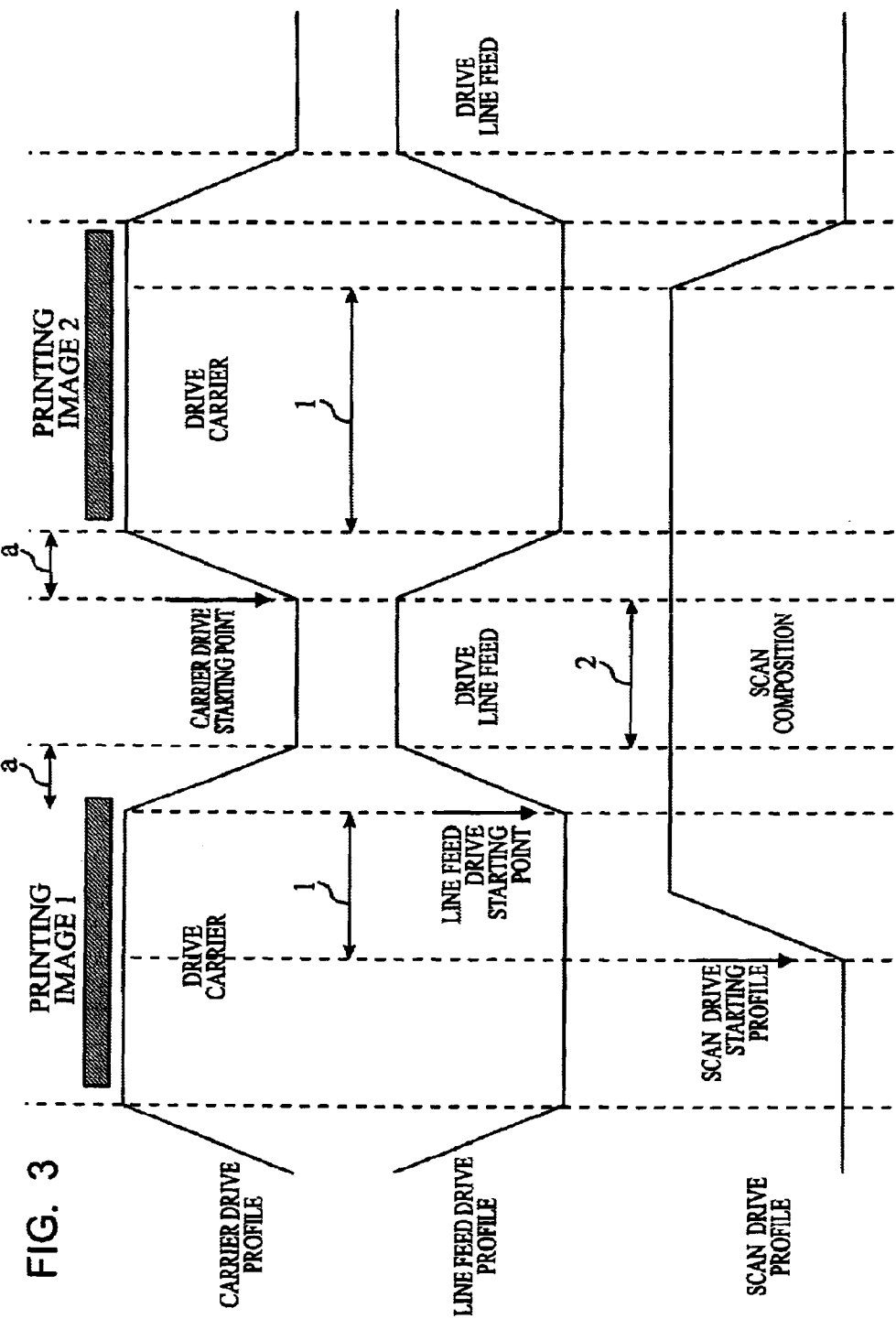
FIG. 3 shows the drive profile for a dual job processing of a prior art multifunction peripheral.

The dual job processing method for the multifunction peripheral according to the present invention is made into a control program and stored within a memory in the multifunction peripheral, and as the control program is executed by the multifunction peripheral controller, it controls the carrier driver, line feed driver, and scan driver of the multifunction peripheral depicted in FIG. 1. The multifunction peripheral being controlled by the control program is well known in the art and therefore will not be explained here. In this specification, the description will be centered on the dual job processing method of the multifunction peripheral according to the present invention, which is programmed and stored in a memory.

Figure 4:
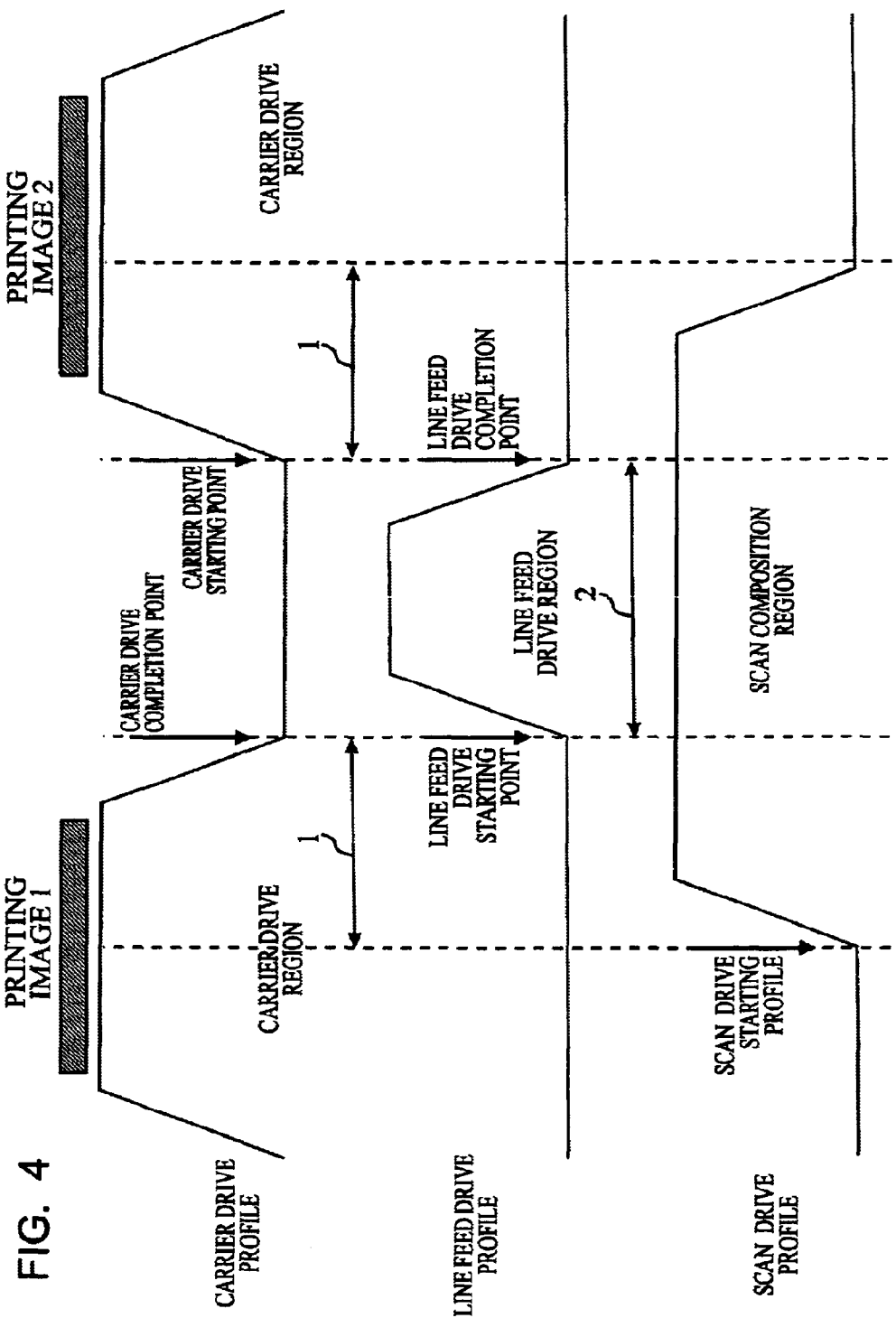
FIG. 4 shows the dual job processing method of the multifunction peripheral according to the present invention.

Referring to FIG. 4, in the dual job processing method of the multifunction peripheral according to the present invention, the dual job processing by a facsimile transmission request during the printing of print data is described hereinafter.

Firstly, when a printing operation request is generated, the multifunction peripheral controller drives the carrier driver and when the carrier driver reaches the uniform speed region via the acceleration region, it prints the print data (printing image 1).

Then, when a scan driver operation request (such as a facsimile transmission request) is received, the multifunction peripheral controller drives the scan driver and when the scan driver reaches the uniform speed region via the acceleration region, it scans the document.

Meanwhile, the multifunction peripheral controller delays the initiation of the line feed driver drive, which transports printing paper to the carriage, until after the completion of the carrier driver drive, and therefore, the carrier and scan drivers are driven at the same time at region 1, while the line feed and scan drivers are driven at the same time at region 2. Thus, the controller controls the device so that the region where three drivers are driven at the same time can be avoided.

In addition, the multifunction peripheral controller delays the initiation of the line feed driver drive until after the completion of the carrier driver drive, and when the driving of the line feed driver is completed after line feeding printing paper via the acceleration region, uniform speed region and deceleration region, the multifunction peripheral controller starts driving the carrier driver and prints the print data (printing image 2).

On the other hand, in the dual job processing method of the multifunction peripheral according to the present invention, the dual job processing by a printing operation request while scanning is performed through the driving of the scan driver, which will be described hereinafter.

Firstly, when the use of the scan driver is requested for operations such as facsimile transmission, the multifunction peripheral controller drives the scan driver and when the uniform speed region is reached, it scans the document.

When a printing request is generated during scanning, the multifunction peripheral controller drives the carrier driver and prints the print data on paper. At this time, the driving of the line feed driver is delayed and initiated after the completion of the carrier driver drive and therefore, the device is controlled such that the three drivers are not driven at the same time.

As described above, according to the present invention, by avoiding the region where the actions of the three drivers overlap, power overload can be prevented, and the power supply device can be used with maximum efficiency and the problem such as power drop, which is derived from power overload, can be resolved.

It is to be understood, however, that even though the present invention has been described with reference to the annexed drawings which depict the preferred embodiments thereof, the present invention is not limited to the said embodiments, and may apparently be modified in many ways by those ordinarily skilled in the art without departing from the general principle and scope of the invention expressed in the appended claims.

What is claimed is:

1. A method of processing dual jobs on a multifunction peripheral, comprising the steps of delaying a drive time of a line feed driver and initiating said line feed driver after the driving of a carrier driver is completed when the driving of said carrier driver and a scan driver are requested at the same time according to a predetermined operation request sequence, only two drivers among said carrier driver, said line feed driver and said scan driver being actuated at the same time, said multifunction peripheral including said carrier driver accommodating printing operations, said line feed driver supplying printing paper, and said scan driver scanning documents.

2. The method of claim 1, when an operation requiring the use of said scan driver is requested while printing is being performed by driving said carrier driver, said scanning of documents is performed by driving said scan driver, and the drive time of said line feed driver is delayed and initiated after the driving of said carrier driver is completed.

3. The method of claim 2, with the operation requiring the use of said scan driver being a facsimile transmission.

4. The method of claim 1, when requesting printing while scanning is being performed by driving said scan driver, printing is performed by driving said carrier driver, and the drive time of said line feed driver is delayed and initiated after the driving of said carrier driver is completed.

5. The method of claim 1, with the driving of said carrier driver being initiated after the driving of said line feed driver is completed.

6. The method of claim 1, with said carrier driver, line feed driver, and scan driver being controlled by a control program of a controller.

7. The method of claim 2, when requesting printing while scanning is being performed by driving said scan driver, printing being performed by driving said carrier driver, and the drive time of said line feed driver being delayed until the driving of said carrier driver is completed, said line feed driver being initiated after the driving of said carrier driver being completed.

8. The method of claim 7, the operation requiring the use of said scan driver being a facsimile transmission.

9. The method of claim 8, with the driving of said carrier driver being initiated after the driving of said line feed driver is completed.

10. A method, comprising the steps of:
    feeding an apparatus a first printable medium through a line feed driver and completing into a standstill region after driving in a deceleration region;
    printing on said first printable medium through a carrier driver;
    performing a first function by said apparatus through a first driver;
    delaying a driving in an acceleration region to a uniform speed region of feeding of a second printable medium when there is a request for printing and said first function at the same time; and feeding said second printable medium to said apparatus when said printing on said first printable medium or said first function is completed into said standstill region after finish driving in said deceleration region, said acceleration region preparing the driver until normal action can be preformed when a drive request is made to the driver, said uniform speed region being where the driver performs normal action, said deceleration region progressively decreases action speed when a driver completion request is made during normal action performance due to the mechanical characteristics of the driver, and a standstill region in which the driver comes to a standstill after a certain period of time, where the normal action in said uniform speed region is printing an image with said carrier driver, feeding a printable medium with said line feed driver or scanning a composition with said scan driver.

11. The method of claim 10, with said first function being a scanning of an image, with said feeding of said second printable medium being delayed when an operation requests said apparatus to scan the image while said apparatus is printing on said first printable medium, said feeding of said second printable medium being initiated into said acceleration region when said printing completes into said standstill region after said deceleration region.

12. The method of claim 10, with said first function being a scanning of an image, with said feeding of said second printable medium being delayed when an operation requests said apparatus to print on said first printable medium while said apparatus is scanning the image, said feeding of said second printable medium being initiated when said scanning completes into said standstill region after said deceleration region.

13. The method of claim 12, with said feeding of said second printable medium being delayed when an operation requests said apparatus to scan the image while said apparatus is printing on said first printable medium, said feeding of said second printable medium being initiated when said printing completes.

14. The method of claim 10, with said scanning of the image being performed in a facsimile transmission.

15. The method of claim 10, with said printing being initiated after completing said feeding of said first printable medium into said standstill region.

16. The method of claim 13, with only two among said printing, said feeding and said scanning being actuated at the same time by driving in said acceleration region, uniform speed region or deceleration region and the third being in said standstill region.

17. A method of a multifunction peripheral apparatus, comprising of delaying a drive time of a line feed driver and initiating said line feed driver after the driving of a carrier driver is completed when the driving of said carrier driver and a third driver are requested at the same time, only two drivers among said carrier driver, said line feed driver and said third driver being actuated at the same time, said carrier driver accommodating printing operations, said line feed driver supplying printing paper, and said third driver performing a function of the multifunction peripheral apparatus requiring power from the multifunction peripheral.

18. The method of claim 17, with the third driver being a scan driver scanning documents.

19. The method of claim 10, with said feeding, printing and first function being performed without a predetermined priority order, with said first function being a function of multifunction peripheral.

20. A memory of said multifunction peripheral having computer-executable instructions for performing the method of claim 1.

* * * * *